Jan. 8, 1929.                                                                                     1,698,676
H. A. DENMIRE
AIR BAG
Filed March 30, 1927                     4 Sheets-Sheet 1

INVENTOR
Harold A. Denmire
BY
Evans & McCoy
ATTORNEYS

INVENTOR
Harold A. Denmire
BY Evans + McCoy
ATTORNEYS

Patented Jan. 8, 1929.

1,698,676

UNITED STATES PATENT OFFICE.

HAROLD A. DENMIRE, OF AKRON, OHIO, ASSIGNOR TO THE GENERAL TIRE & RUBBER COMPANY, OF AKRON, OHIO, A CORPORATION OF OHIO.

AIR BAG.

Application filed March 30, 1927. Serial No. 179,458.

This invention relates to air bags for use in the manufacture of pneumatic tire casings and particularly to an improved air bag construction that is so formed as to have greatly increased lasting qualities and operational advantages not heretofore found in air bags.

Endless air bags formed of rubber composition have long been used in the vulcanization of pneumatic tires for forcibly compressing the material of the tire casing against the confining side walls of the molding cavity. In this service the air bag is required to be diametrically collapsed and twisted and bent to various positions in its insertion into or removal from tire casings. This abuse of the bag tends to prematurely break down the walls and the inner thickened ridge of the bag to such an extent that the life of the bag is greatly limited and the cost of vulcanizing individual tire casings greatly increased.

The outer face of an air bag used in the vulcanization of pneumatic tire casings, rapidly deteriorates from the migration of sulphur into the outer surface of the bag that produces cracks, flaws and breaks in the surface of the bag that cause its premature destruction. The outer surface of a bag made brittle by such migration of sulphur soon breaks because of the mechanical abuse to which the bag is subjected in service and the usefulness of the bag is destroyed.

The present invention contemplates the use of a sectional or discontinuous air bag that may be removed from the tire casing without harmful distortion of the body of the bag.

One of the objects of the present invention is the provision of a discontinuous or sectional air bag that may be used in the vulcanization of pneumatic tire casings.

Another object of the invention is to provide a collapsible air bag that may be repeatedly removed and inserted in the casings without substantial injury to the bag.

An additional object of the invention is to provide a collapsible air bag that is attached to and remains a part of the vulcanizing heater.

A further object of the invention is the provision of a metallic armor for a sectional air bag.

Additional objects of the invention will be apparent from a study of the embodiments of the invention illustrated in the accompanying drawings wherein.

Figure 1:
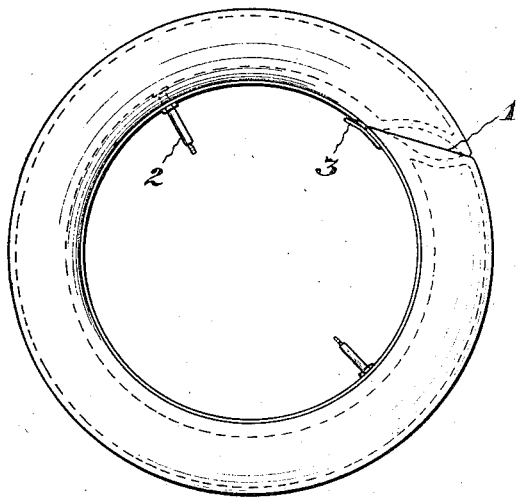
Figure 1 is a plan view of an air bag constructed in accordance with the invention and adapted for use in the vulcanization of a pneumatic tire casing.
Figure 2:
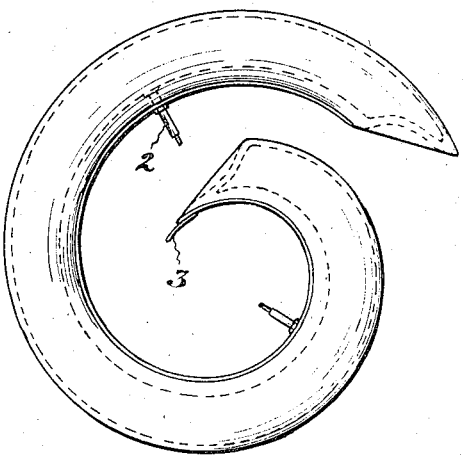
Fig. 2 is a corresponding view of the air bag shown in Fig. 1 shown in a position to which the bag is preferably bent in its insertion or removal from a tire casing.

The collapsible air bag shown in Figs. 1 and 2 is formed of any suitable yielding material and is transversely cut along the line 1 to provide a discontinuous bag that may be removed from or inserted into a tire casing by progressively inserting portions of the body of the bag to form a complete annular inflatable bag when mounted within the tire casing. In this application of the invention the bag is provided with a conventional form of inflating valve stem 2 and a tab or ring 3 that assists in removing one of the end portions of the bag from the tire casing. After insertion of this bag in a tire casing its use is precisely the same in the vulcanization of the casing as in conventional endless annular air bags now generally employed. By forming the bag discontinuous or collapsible one end portion of the bag may first be drawn from the casing and the remaining body of the bag progressively pulled from the casing without harmful and destructive bending of the body of the bag in its removal. The insertion of the bag within the casing is likewise facilitated by making the bag collapsible. The many advantages to be derived from this embodiment of the invention will be apparent to those skilled in the art.

The abuse to which the bag is subjected is greatly reduced by its discontinuous form and the life of the bag is thereby greatly increased. The speed with which the bag may be inserted or removed from the tire casing is also greatly increased over the continuous or endless form of bag heretofore employed in the vulcanization of tire casings.

Figure 3:
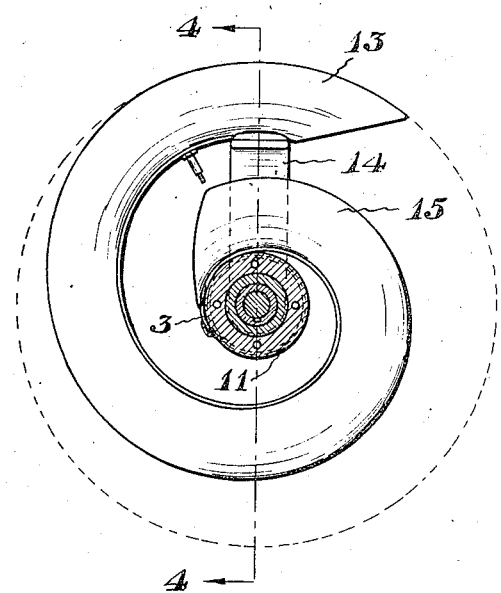
Fig. 3 shows an air bag of the type illustrated in Fig. 1 and Fig. 2 in collapsed position mounted on a vulcanizing heater.
Figure 4:
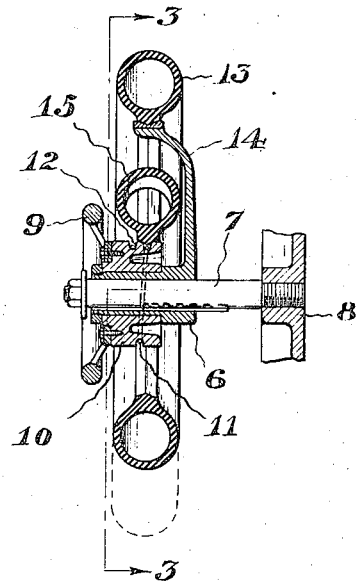
Fig. 4 is a transverse sectional view taken substantially on line 4—4 of Fig. 3 showing a support for the bag.
Figure 5:
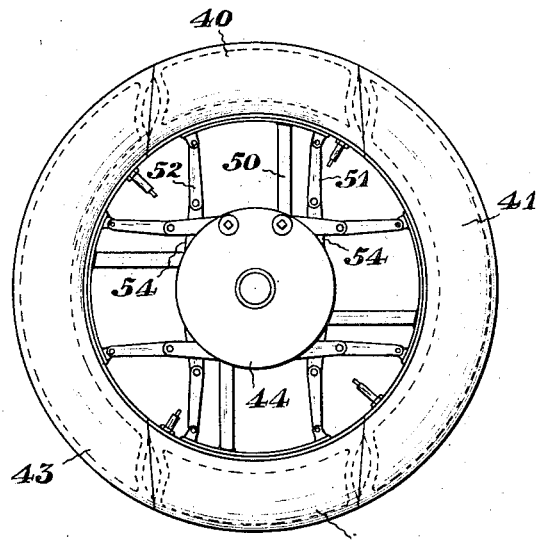
Fig. 5 is a side elevational view of a collapsible air bag mounted on a chuck for use in conveniently collapsing the same.
Figure 6:
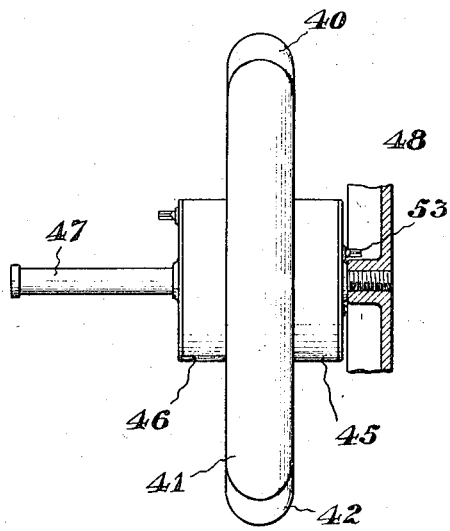
Fig. 6 is a side elevational view of the construction shown in Fig. 5.

The collapsible form of air bag shown in Figs. 1 and 2 may also be satisfactorily used as a component part of the vulcanizing heater and the associated mechanism shown in Figs. 3 and 4 illustrates one method of so mounting a collapsible air bag as to make it a part of the heater mechanism and also to provide convenient mechanism for removing and inserting a bag within a tire casing.

In this embodiment of the invention the bag supporting and manipulating mechanism is carried by a sleeve 6 that is slidably mounted on a shaft 7 that is carried by a portion 8 of the heater unit in order that the bag supporting and operating mechanism may move into and out of operating position in the molding cavity by sliding the bag assembly along the shaft 7 to which the sleeve 6 is keyed to prevent its rotation. A hand wheel 9 that serves to operate a sleeve 10 that is rotatably mounted upon the sleeve 6 has a cable or chain 11 that is connected to the tab 3 of the bag by means of which the bag is mechanically drawn from within the tire casing. The sleeve 10 has a suitable groove 12 formed in its outer face for receiving the cable or chain 11 when the hand wheel 9 is turned to wind the cable on the operating sleeve 10.

The end portion 13 of the bag is carried by the supporting arm 14 that is mounted on the sleeve 6 which is slidably keyed to the shaft 7.

In the operation of the collapsible air bag shown in Figs. 3 and 4 the tire casing is preferably first mounted on the portion 13 of the bag and the hand wheel is turned to progressively permit the bag to fit within the casing around its periphery. After the bag is inserted within the casing the supporting mechanism for the bag and the casing surrounding the same is slid along the shaft 7 to position the bag and casing within the molding cavity as will be clearly understood by those skilled in the art. After vulcanization of the tire casing is completed the bag is quickly and easily removed from the tire casing by turning the hand wheel 9 in a direction to wind up the cable or connecting member 11 which first withdraws the end 15 of the bag from the tire casing and progressively draws the body of the bag out of the tire casing.

The mechanism here shown for mounting the air bag in operative relation with the heater and making it an operating portion thereof so that it in substance becomes a part of the heater unit may be of any desired construction, the specific apparatus shown being merely illustrative of suitable means for mechanically controlling the collapsing of the bag. The collapsible bag may also be formed with a single transverse separation in its body as illustrated in Figs. 1 to 4, inclusive, or the bag may be made up of a plurality of interfitting sectional parts that are either operated independently or in a predetermined manner by suitable mechanism, the broad scope of the invention forming a basis of this application being the provision of a collapsible air bag for use in the vulcanization of tire casings.

In order to insure substantially equal outward pressures from different parts of the air bag, the abutted end portions of the bag are preferably although not necessarily formed with a concave end wall 17 that serves to permit substantially unrestrained outward expansion of the outer face 18 of the bag sections adjacent the end walls. The concave formation of the end wall permits the internal pressure of the bag to expand the end portions of the bag by rendering the closing partition 17 of lesser concavity as the internal pressure in the bag is increased. The general construction of the remaining portions of the bag and the particular construction of the end walls is a matter of design for the particular installation contemplated.

Figure 10:
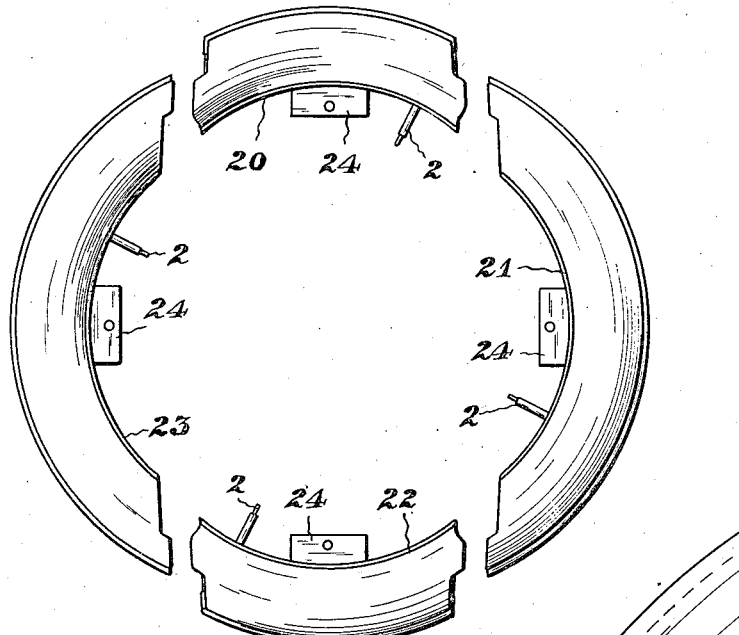
Fig. 10 is a view of a collapsible air bag having an armored surface.
Figure 9:
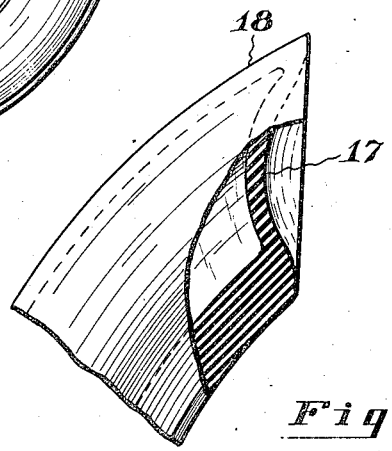
Fig. 9 is a detailed view shown partially in section of an end portion of one of the collapsible bag elements illustrated in Figs. 5, 6, 7 and 8.

Another form of collapsible air bag is shown in the remaining figures of the drawings wherein the bag is illustrated as made up of a plurality of interfitting parts 20, 21, 22, and 23. The number of sections into which the bag is divided being again a question of design to meet the needs of the particular installation contemplated. Sections 21 and 23 of the bag shown in Fig. 10 are first inserted within the tire casing and the end sections 20 and 22 are thereafter fitted in place or the sections may be progressively inserted within the casing so long as one of the end sections 20 or 22 are last fitted in place to complete the annular form of the bag structure. Each of the bag sections in this application of the invention is provided with an operating flange or portion 24 that may either serve as a means for the workmen to withdraw and insert the bag manually or as a means of mounting the bag on any suitable chuck for collapsing and assembling the bag elements mechanically. Each bag section is provided with a suitable valve 2 for inflating the bag after it is mounted within the tire casing.

Figure 11:
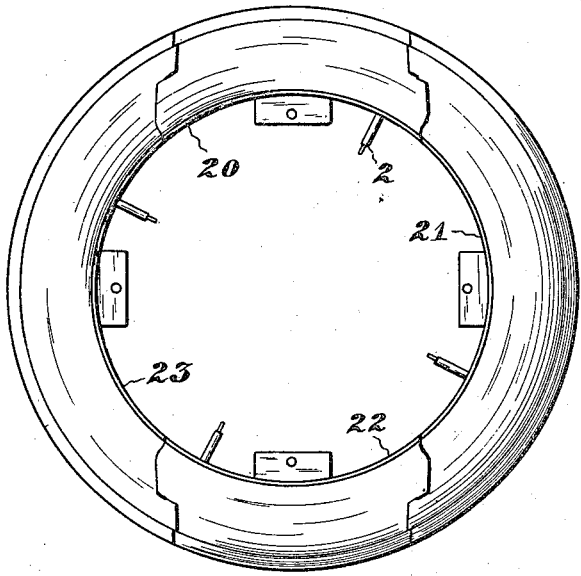
Fig. 11 is a view of the air bag shown in Fig. 10 with the parts interfitting for use in the vulcanization of a tire casing.
Figure 12:
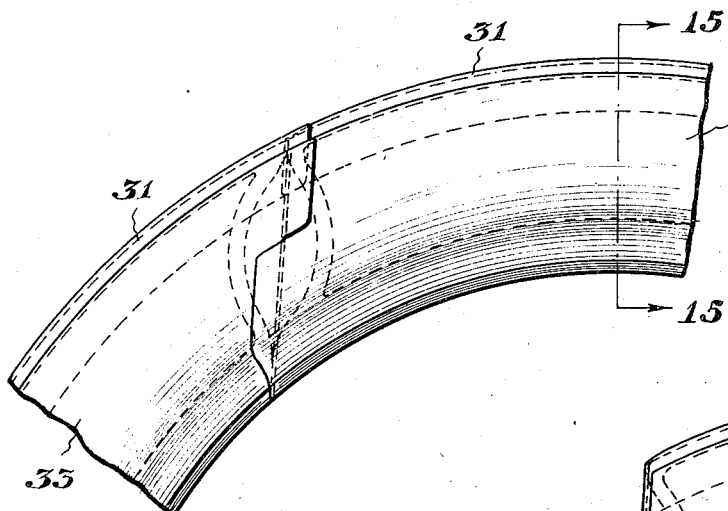
Fig. 12 is an enlarged detailed view of one of the joints between the bag elements shown in assembled position in Fig. 11.

The bag structure and proposed form of armor for protecting the outer face of a proposed collapsible bag is shown in Figs. 12, 13, 14, and 15. It is to be understood however that the particularly useful form of armor for the bag elements is not essential to the form of collapsible bag herein illustrated. The armor is rendered desirable and particularly useful in order to prevent undesirable migration of sulphur or deterioration of the outer surface of the bag from immediate contact with the surface of the tire casing being cured. The use of a metallic armor over the face of the bag is highly desirable because of the improved finished surface that it gives to the interior of the tire casing and also by reason of the ease with which the bag is inserted into and removed from the tire casing and the greatly increased life that is thereby given to the collapsible bag structure. It will also be apparent that the bag sections particularly illustrated in Figs. 10 and 11 may be provided with any suitable surfacing material within the scope of this invention.

Figure 13:
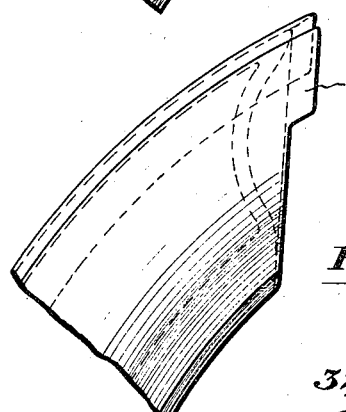
Fig. 13 is a view of an end portion of one of the bags shown in Fig. 12.
Figure 14:
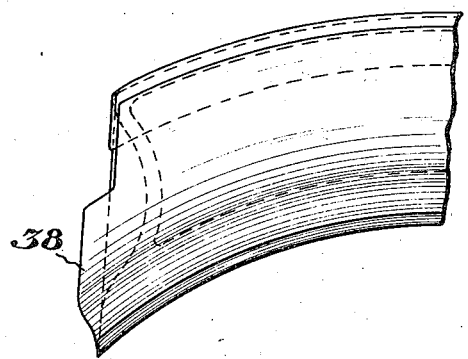
Fig. 14 is a view of the end portion of the other bag element shown in Fig. 12.
Figure 15:
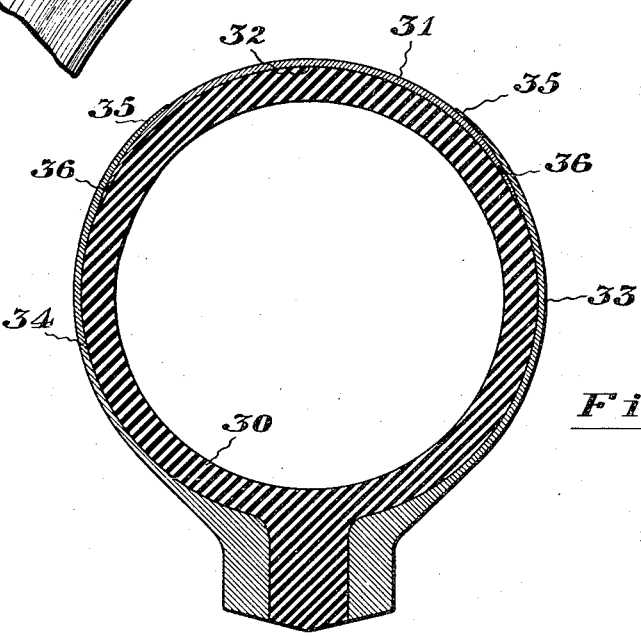
Fig. 15 is a further enlarged transverse cross sectional view taken substantially on line 15—15 of Fig. 12 showing the construction of the armored portion.

The particular form of the body of the bag is illustrated in Fig. 15 taken in connection with Figs. 13 and 14. The body of the bag 30 is of any desired extensible material such as rubber composition. A relatively thin plate of sheet steel, aluminum alloy, or other suitable surfacing material 31 is permanently secured to the body 30 of the bag by vulcanizing its longitudinal central portion 32 of the outer face of the body portion 30 of the bag. Side wall protecting plates 33 and 34 that have their outer edge portions 35 overlying and protecting the edge portions 36 of the peripheral plates 31 permit radial expansion of the bag 30 through the sliding of the portion 35 of the side plates over the portions 36 of the peripheral plate. The end portions 36 of the side plates may also be formed with suitable interlocking mechanism for engaging the peripheral plate 31 in the event that the plates 31 are not permanently secured to the body of the bag, it being desirable however that the exposed surface of the plates 31, 33 and 34 be smooth and free from undesirable irregularities that would roughen the interior of the tire casing. The peripheral plate 31 and the side plates 33 extend beyond the ends of the encased air bag 30 in order to provide an overlapping joint for the adjacent armored bag section that is of sufficient extent to take up the peripheral increase of the collapsible air bag that results from its inflation thereby presenting a substantially unbroken molding surface to the inner face of the tire casing. The end portions 20 and 22 of the collapsible air bag have portions 38 that overlap the radially inner portions of the side plates 33 and 34 for like reason.

It will be apparent to those skilled in the art that a collapsible air bag of the character shown in Figs. 10 to 15 inclusive may be mounted on any suitable type of collapsing mechanism or the separate elements of the bag may be manually assembled and removed within the scope of the present invention. A suitable form of collapsing mechanism that is proposed solely in order to illustrate the operation of the invention is shown in Figs. 5 to 8 inclusive, the operating mechanism being schematic and not intended to represent a preferred form of bag collapsing and assembling chuck. The bag elements 40, 41, 42 and 43 that are carried by the collapsible chuck unit 44 may either be armored or not as desired. The particular units illustrated are shown without the metallic armor described in connection with Figs. 10 to 15 inclusive. The bag collapsing and expanding mechanism comprises an operating unit 45 that controls the movement of the end portions 40 and 42 of the collapsible air bag and an operating portion 46 that controls the collapsing of the side portions 41 and 43. In this embodiment of the invention the operating mechanisms 45 and 46 are slidably carried on a single shaft 47 that permits movement of the assembled bag units relative to the body of the heater 48 in order that the assembled bag may be moved in different relations with respect to the molding cavity for the tire casing.

Figure 7:
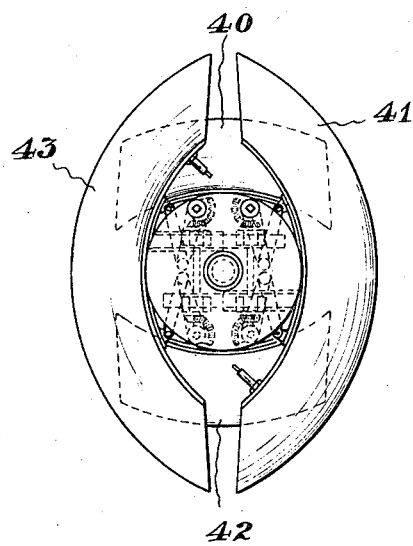
Fig. 7 is a corresponding side elevational view of the air bag shown in Fig. 5 in collapsed condition.
Figure 8:
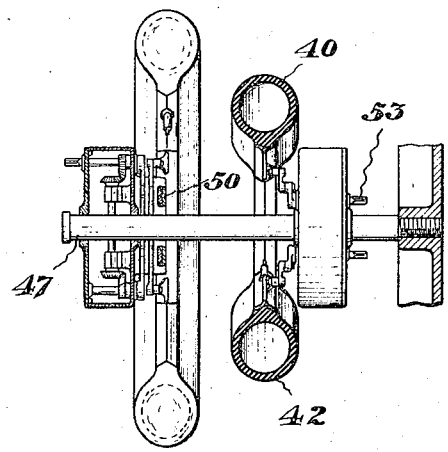
Fig. 8 is a transverse sectional view of the bag shown in Fig. 7 in its collapsed condition.

The collapsing mechanism shown comprises a guiding rod 50 that is carried by each bag section and a pair of toggle links 51 and 52 that serve to draw the corresponding bag unit 40 inwardly upon operation of the rack and pinion mechanism 53 to swing the arms 54 of the bag supporting mechanism inwardly toward each other to thereby withdraw the end portions 40 and 42 from the tire casing. After the end portions 40 and 42 are withdrawn from the tire casing they may be slid laterally as shown in Fig. 8 in order to provide room for the collapsing of the end sections 41 and 43 as shown in Fig. 7. Since any suitable collapsing mechanism may be used for assembling and disassembling the collapsible bag units it is deemed unnecessary to give more than a general description of the means for accomplishing this result.

It will be obvious to those skilled in the art that many forms of collapsible air bags may be proposed within the scope of the present invention. The particular forms of collapsible air bags illustrated being shown merely in order to illustrate diversified embodiments of the invention.

The advantages to be enjoyed from mechanism of this character will be apparent to those skilled in the art. The life of the air bag is greatly increased by avoiding the abusive use to which the endless bags have heretofore been subjected in inserting and removing the bags from the casing. The speed with which the bag may be inserted within and withdrawn from a tire casing is also greatly increased and a form of bag is proposed which renders it possible to provide a metallic molding surface to the bag that was heretofore impossible with bags of the endless annular form. The further provision of a form of air bag that can be permanently carried by the vulcanizing heater greatly reduces the number of air bags required for the vulcanization of tire casings and thereby decreases the unit expense of vulcanizing the same.

Other objects and advantages to be derived from practicing the invention will be apparent to those skilled in the art.

What I claim is:

1. A vulcanizing heater comprising a collapsible air bag formed of a plurality of interfitting inflatable sections, and means for collapsibly mounting said sections on said heater in operative relation with respect to the molding cavity thereof.

2. An expansible air bag for use in vulcanizing pneumatic tire casings comprising a transversely divided collapsible air bag having a surface covering of sheet metal.

3. The combination with a vulcanizing heater, of a collapsible air bag mounted in operative relation therewith and forming a cooperating part thereof.

4. The combination with a vulcanizing heater of the watch case type, of a collapsible air bag embodying a plurality of interfitting sections adapted to collectively form an annular expansible core for use in the manufacture of pneumatic tire casings, and means carried by the heater for operating said sections.

5. A collapsible air bag formed of arcuate inflatable sections, and an arcuate expansible sheet metal cover section enclosing each inflatable section.

6. A collapsible air bag formed of arcuate inflatable sections, and an arcuate expansible sheet metal cover section enclosing each inflatable section, each sheet metal section having a rigid portion at the interior of the annulus and a longitudinally divided expansible portion enclosing the inflatable section of the air bag.

7. A collapsible air bag formed of arcuate inflatable sections, and an arcuate expansible sheet metal cover section enclosing each inflatable section, said sheet metal sections having interfitting end portions overlapping the joints of the inflatable sections.

8. In a vulcanizing heater, a collapsible air bag formed of a plurality of interfitting inflatable sections, and a support for the air bag comprising an axial supporting member and a collapsible support for each section mounted on said member, said supports being movable outwardly from the supporting member to positions in which the air bag sections are joined end to end in the form of an annulus.

In testimony whereof I affix my signature.

HAROLD A. DENMIRE.